United States Patent
Matthews et al.

(10) Patent No.: US 9,203,759 B2
(45) Date of Patent: Dec. 1, 2015

(54) SWITCH STATE REPORTING

(71) Applicant: Broadcom Corporation, Irvine, CA (US)

(72) Inventors: William Brad Matthews, San Jose, CA (US); Bruce Hui Kwan, Sunnyvale, CA (US); Puneet Agarwal, Cupertino, CA (US)

(73) Assignee: BROADCOM CORPORATION, Irvine, CA (US)

( * ) Notice: Subject to any disclaimer, the term of this patent is extended or adjusted under 35 U.S.C. 154(b) by 309 days.

(21) Appl. No.: 13/827,780

(22) Filed: Mar. 14, 2013

(65) Prior Publication Data
US 2014/0126395 A1 May 8, 2014

Related U.S. Application Data

(60) Provisional application No. 61/723,511, filed on Nov. 7, 2012.

(51) Int. Cl.
*G01R 31/08* (2006.01)
*H04L 12/801* (2013.01)
*H04L 12/933* (2013.01)

(52) U.S. Cl.
CPC ............... *H04L 47/11* (2013.01); *H04L 49/15* (2013.01)

(58) Field of Classification Search
CPC ......... H04L 47/00; H04L 47/11; H04L 45/00; H04L 45/127; H04L 45/22; H04L 45/24; H04L 45/70; H04L 47/10; H04L 47/15
See application file for complete search history.

(56) References Cited

U.S. PATENT DOCUMENTS

| | | | |
|---|---|---|---|
| 6,785,237 B1 * | 8/2004 | Sufleta | 370/236 |
| 2005/0114288 A1 * | 5/2005 | Dettinger et al. | 707/1 |
| 2009/0304007 A1 * | 12/2009 | Tanaka et al. | 370/395.53 |
| 2010/0191878 A1 * | 7/2010 | Nandagopalan et al. | 710/56 |
| 2012/0195205 A1 * | 8/2012 | Retana et al. | 370/241 |
| 2012/0250494 A1 * | 10/2012 | Rong et al. | 370/216 |

* cited by examiner

*Primary Examiner* — Anh Ngoc Nguyen
(74) *Attorney, Agent, or Firm* — Oblon, McClelland, Maier & Neustadt, L.L.P.

(57) ABSTRACT

Disclosed are various embodiments that relate to a network switch. The network switch obtains a network state metric, the network state metric quantifying a network traffic congestion associated with a switch. The network switch identifies a synchronous time stamp associated with the network state metric and generates an network state reporting message, the network state reporting message comprising the network state metric and the synchronous time stamp. The network state reporting message may be transmitted to a monitoring system.

20 Claims, 4 Drawing Sheets

SWITCH STATE REPORTING

CROSS-REFERENCE TO RELATED APPLICATIONS

This application is a utility application that claims priority to U.S. Provisional Patent Application titled, "Switch State Reporting", having Ser. No. 61/723,511, filed Nov. 7, 2012, which is entirely incorporated herein by reference.

BACKGROUND

A collection of servers may be used to create a distributed computing environment. The servers may process multiple applications by receiving data inputs and generating data outputs. Network switches may be used to route data from various sources and destinations in the computing environment. For example, a network switch may receive network packets from one or more servers and/or network switches and route the network packets to other servers and/or network switches. Accordingly, network traffic may flow at varying rates through the network switches. It may be the case that a particular set of network switches experiences a disproportionate amount of network traffic congestion with respect to other network switches.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing a global snapshot of the network state of a computing environment. Various network switches in the computing environment are configured to obtain one or more network state metrics associated with network traffic congestion of the network switch. The network switch may send out a network state reporting message to a network state monitor. Thus, the network state monitor may receive state data from each participating network switch. The network state manager may build a map or global snapshot based on the network state data received from each network switch. For example, the global snapshot may provide a coherent view of the computing environment to identify root causes related to traffic flow and resource allocation issues in the computing environment.

In various embodiments of the present disclosure, each network switch reports one or more network state metrics associated with the respective network switch. Furthermore, each network switch may be configured to report a corresponding network state metric according to a time synchronizing protocol. A time synchronization protocol may comprise, for example, an Institute of Electrical and Electronics Engineers (IEEE) 1588 protocol. According to some embodiments, each network switch may be synchronized to a reference clock. Accordingly, each transmission of a network state reporting message is synchronized with network state reporting messages transmitted by other network switches in the computing environment. Thus, a network state monitor may receive synchronized network state reporting messages from each of the networks switches in order to generate a global snapshot of the computing environment.

Figure 1:
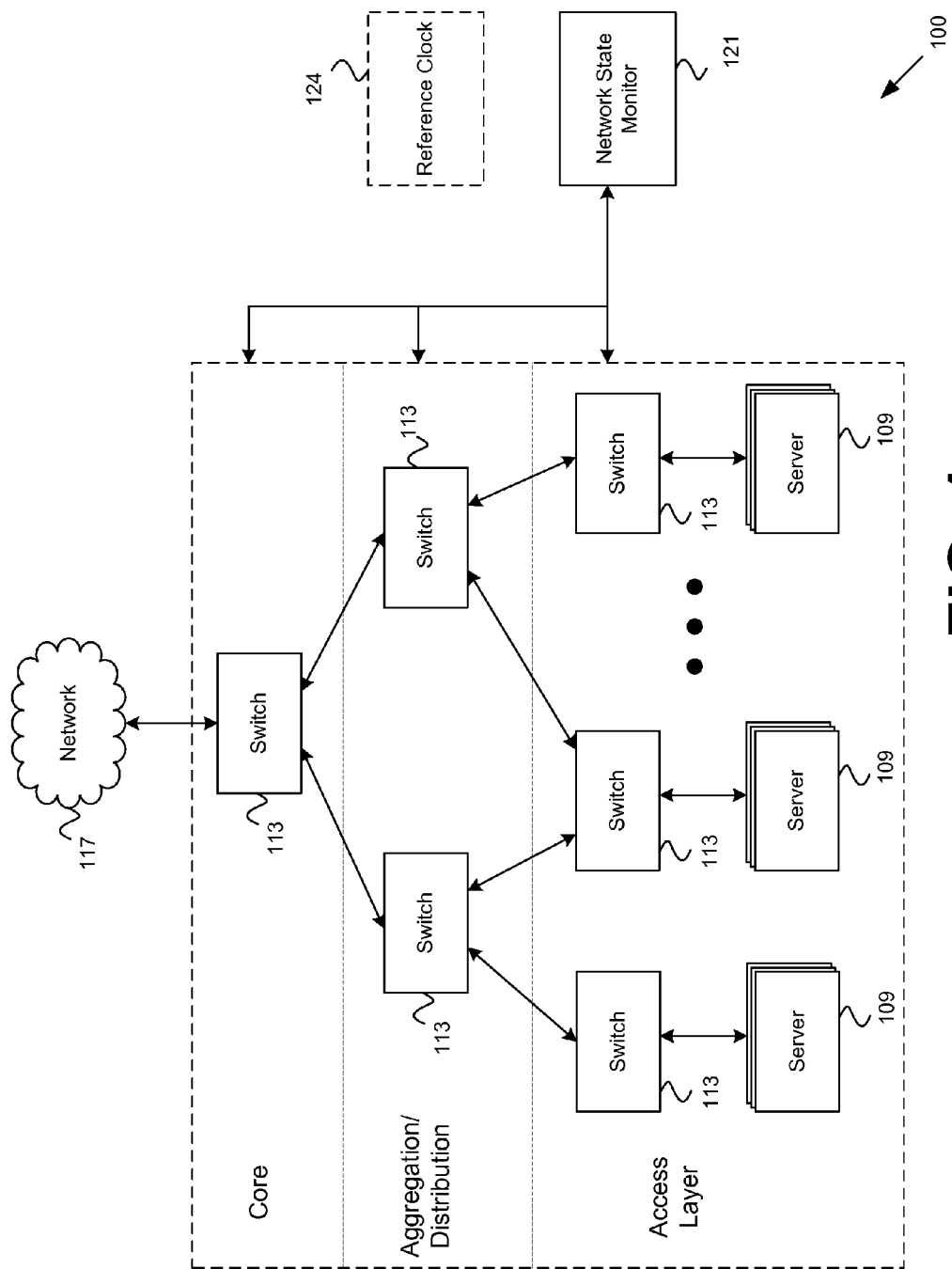
FIG. 1 is a drawing of a computing environment, according to various embodiments of the present disclosure.

With reference to FIG. 1, shown is a computing environment 100. The computing environment 100 may comprise a private cloud, a data warehouse, a server farm, or any other collection of computing devices that facilitate distributed computing. The computing environment 100 may be organized in various functional levels. For example, the computing environment 100 may comprise an access layer, an aggregation/distribution layer, a core layer, or any other layer that facilitates distributed computing.

The access layer of the computing environment 100 may comprise a collection of computing devices such as, for example, servers 109. A server 109 may comprise one or more server blades, one or more a server racks, or one or more computing devices configured to implement distributed computing.

To this end, a server 109 may comprise a plurality of computing devices that may are arranged, for example, in one or more server banks, computer banks, or other arrangements. For example, the server 109 may comprise a cloud computing resource, a grid computing resource, and/or any other distributed computing arrangement. Such computing devices may be located in a single installation. A group of servers 109 may be communicatively coupled to a network switch 113. The network switch 113 may relay input data to one or more servers 109 and relay output data from one or more servers 109. A network switch 113 may comprise a router, a hub, a bridge, or any other network device that is configured to facilitate the routing of network packets.

The aggregation/distribution layer may comprise one or more network switches 113. The network switches 113 of the aggregation/distribution layer may route or otherwise relay data between the access layer. The core layer may comprise one or more network switches 113 for routing or relaying data between the aggregation/distribution layer. Furthermore, the core layer may receive inbound data from a network 117 and route the incoming data throughout the core layer. The core layer may receive outbound data from the aggregation/distribution layer and route the outbound data to the network 117. Thus, the computing environment 100 may be in communication with the network 117 such as, for example, the Internet.

The computing environment 100 may further comprise a network state monitor 121. The network state monitor 121 may comprise one or more computing devices that are communicatively coupled to one or more network switches 113 of the computing environment 100. The network state monitor 121 may be configured to execute one or more monitoring applications for generating a global snapshot of the network state of the computing environment 100.

In various embodiments, the computing environment 100 comprises a reference clock 124. The reference clock 124 may be a global clock that is implemented in accordance with a time synchronizing protocol. The various components of the computing environment 100 such as, for example, the network switches 113, may be synchronized according to the reference clock 124. In this respect, the various components of the computing environment 100 implement a time synchronizing protocol based on a reference clock 124 or any other clock.

Next, a general description of the operation of the various components of the computing environment 100 is provided. To begin, the various servers 109 may be configured to execute one or more applications or jobs in a distributed manner. The servers 109 may receive input data formatted as network packets. The network packets may be received by the server 109 from a network 117. The received network packets may be routed through one or more network switches 113 and distributed to one or more servers 109. Thus, the servers 109 may process input data that is received via the network 117 to generate output data. The output data may be formatted as network packets and transmitted to various destinations within the computing environment 100 and/or outside the computing environment 100.

As the servers 109 execute various distributed applications, the computing environment 100 may experience network traffic flowing throughout the computing environment 100. This may be a result of network packets flowing through the various network switches 113. The flow of network traffic may cause network traffic congestion in portions of the computing environment 100. For example a particular set of network switches 113 may experience significantly more network traffic congestion than other network switches 113 in the computing environment 100.

The network packets flowing through the computing environment 100 may correspond to various packet classes, packet priorities, or any other prioritization scheme. Furthermore, network packets may be associated with a particular application or job executed by a server 109. This may lead to network traffic patterns in the computing environment 100, where such traffic patterns may be characterized based on packet priority, packet class, application, etc.

Each network switch 113 may receive one or more data packets. A network switch 113 may store a data packet in a packet buffer according to a buffer address. The data packet may be associated with a packet queue. The packet queue facilitates a prioritization of the data packet. A network switch 113 may further comprise a scheduler, where the scheduler determines a transmission order for the data packets. For example, the scheduler may prioritize one queue among a set of queues for transmission of the data packet. Based on various prioritization schemes and/or scheduling schemes, data packets received by a network switch 113 are routed to various destinations.

As a network switch 113 receives a relatively large influx of data packets, the packet buffer resources may be consumed. Also, various packet queues may also become heavily populated in response to the network switch 113 receiving many data packets. Individual data packets may experience packet delays throughout a routing through the network switch 113. And furthermore, the power consumption associated with portions of the network switch 113 may increase. To this end, a large influx of data packets may increase the consumption of network switch resources, where the network switch resources may be expressed in terms of memory consumption, power consumption, packet queue utilization, packet delay, or any combination thereof.

A large influx of data packets in a network switch 113 may indicate a relatively large degree of network traffic congestion associated with the network switch 113. As the network switch resources are consumed by the network traffic congestion, various network state metrics may be determined for the network switch 113. A network state metric may comprise a quantification of network traffic congestion associated with a particular network switch 113. For example, the network state metric may relate to a memory buffer capacity, the number of packets accumulated in one or more queues, a power consumption amount, a packet delay amount, or any combination thereof.

The network switches 113 of the computing environment 100 may also implement a time synchronizing protocol, such as, but not limited to, a Precision Time Protocol (PTP), a protocol defined by IEEE 1588 or any variant thereof, a Network Time Protocol (NTP), or any combination thereof. A time synchronization protocol may utilize a reference clock 124 for coordinating a plurality of network components such as, for example, a network switch 113. To this end, the timing may be maintained for each network switch 113 in the computing environment 100. According to this timing, network state information generated by each network switch 113 may be associated with a synchronous time stamp. That is to say, a network state metric associated with a particular network switch 113 may be linked to a particular time stamp. This particular time stamp may be relative to the reference clock 124 and/or time stamps associated with other network switches 113.

Each network switch 113 may generate a network state reporting message, where the network state reporting message comprises a network state metric associated with the network switch 113 and a synchronous time stamp associated with the network state metric. The network switch 113 may transmit the network state reporting message to a predetermined network state monitor 121.

The network state monitor 121 may receive a plurality of network state reporting messages from the various network switches 113 in the computing environment 100. The network state monitor 121 may develop a snapshot of the computing environment 100 with respect to network traffic congestion in the computing environment 100. Through the use of synchronized network state metrics generated by the various network switches 113, the network state monitor 121 may identify network switches 113 associated with disproportionately high or low network traffic. To this end, the network state monitor 121 may monitor network traffic throughout various portions of the computing environment 100.

Based on the global snapshot of the network state, operators/administrators may take action such as, for example, reallocate job scheduling across the various servers 109, identify sources of network traffic congestion, or make any adjustments to the distributed computing procedures employed by the servers 109.

Figure 2:
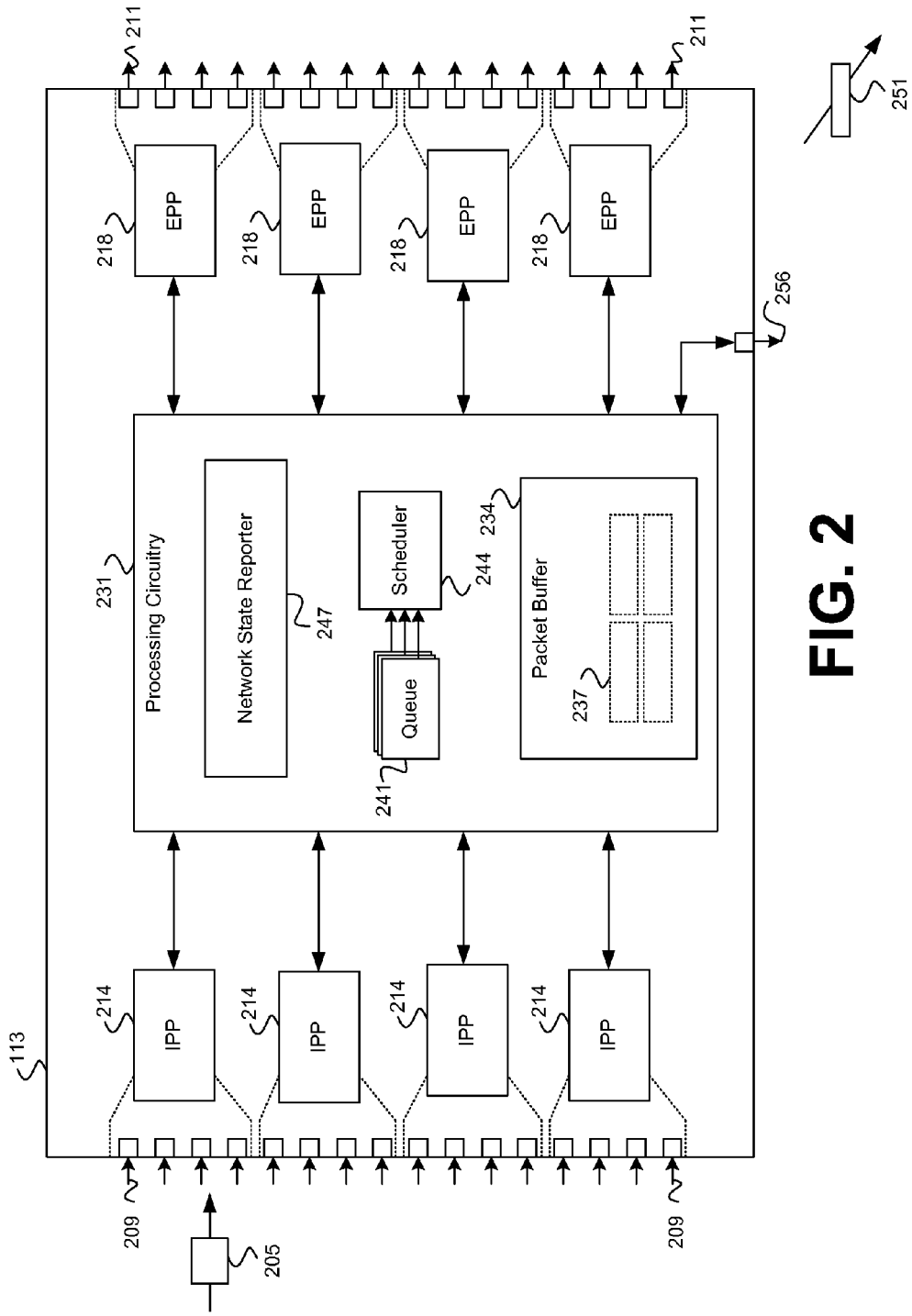
FIG. 2 is a drawing of an example of a network switch implemented in the computing environment of FIG. 1, according to various embodiments of the present disclosure.

Turning now to FIG. 2, shown is a drawing of an example of a network switch 113 implemented in the computing environment 100 of FIG. 1, according to various embodiments of the present disclosure. The network switch 113 depicted in the non-limiting example of FIG. 2 may represent any network switch 113 of FIG. 1. FIG. 2 provides an example of one among a plurality of possible network switch architectures. Alternate network switch architectures may be used to effectuate the functionality of a network switch 113 without departing substantially from the spirit and principles of the disclosure.

The network switch 113 may correspond to a switch, a router, a hub, a bridge, or any other network device that is configured to facilitate the routing of network packets. The network switch 113 is configured to receive one or more data packets 205 from a source and route these data packets to or five to one or more destinations the network switch 113 may comprise one or more input ports 209 that are configured to receive one or more data packets to under five. The network switch 113 also comprises a plurality of output ports 211. The network switch 113 performs various prioritization and/or scheduling schemes for routing a data packet 205 from one or more input ports 209 to one or more output ports 211.

The time it takes for a data packet 205 to flow through at least a portion of the network switch 113 may be referred to as a "packet delay." Furthermore, depending on the type of data packet 205, the data packet 205 may vary in priority with respect to other data packets. By employing various prioritization/scheduling schemes, the time it takes for the data packet 205 to flow through the network switch 113 may vary from one data packet 205 to another.

The network switch 113 comprises one or more ingress packet processors 214. Each ingress packet processor 214 may be configured to be bound to a subset of input ports 209. In this sense, and ingress packet processor 214 corresponds to a respective input port set. In addition to associating an incoming packet to an input port set, the ingress packet processors 214 may be configured to process the incoming data packet 205.

The network switch 113 also comprises one or more egress packet processors 218. An egress packet processor 218 may be configured to be bound to a subset of output ports 211. In this sense, each egress packet processor 218 corresponds to a respective output port set. In addition to associating an outgoing packet to an output port set, the egress packet processors 218 may be configured to process the outgoing data packet 205.

Incoming data packets 205, such as those packets received by the input ports 209, are processed by processing circuitry 231. In various embodiments, the processing circuitry 231 is implemented as at least a portion of a microprocessor. The processing circuitry 231 may include one or more circuits, one or more processors, application specific integrated circuits, dedicated hardware, digital signal processors, microcomputers, central processing units, field programmable gate arrays, programmable logic devices, state machines, or any combination thereof. In yet other embodiments, processing circuitry 231 may include one or more software modules executable within one or more processing circuits. The processing circuitry 231 may further include memory configured to store instructions and/or code that causes the processing circuitry 231 to execute data communication functions.

In various embodiments the processing circuitry 231 may be configured to prioritize, schedule, or otherwise facilitate a routing of incoming data packets 205 to one or more output ports 211. The processing circuitry 231 receives data packets 205 from one or more ingress packet processor 214. The processing circuitry 231 performs packet scheduling and/or prioritization of received data packets 205. To this end, the processing circuitry 231 may comprise a traffic manager for managing network traffic through the network switch 113.

To execute the functionality of the processing circuitry 231, one or more packet buffers 234 may be utilized. For example, the processing circuitry 231 may comprise a packet buffer for storing data packets 205. In various embodiments, the packet buffer 234 is divided into a number of partitions 237. The packet buffer 234 is configured to absorb incoming data packets 205.

For facilitating traffic management, processing circuitry 231 may further comprise one or more packet queues 241 and one or more schedulers 244. A packet queue 241, for example, may comprise a link list of buffer addresses that reference data packets 205 stored in the packet buffer 234. In various embodiments, a packet queue 241 comprises a first in first out (FIFO) buffer of buffer addresses. As a non-limiting example, a particular packet queue 241 is accumulated such that the accumulation is expressed in terms of an amount of bytes of memory or a number of data packets 205 associated with the packet queue 241. Furthermore, each packet queue 241 may be arranged in terms of priority.

A scheduler 244 may be associated with a set of packet queues 241. The scheduler 244 may employ one or more packet prioritization/scheduling schemes for selecting a particular packet queue 241. The scheduler 244 may determine an order for transmitting a set of data packets 205 via one or more output ports 211. By transmitting data packet 205, a data packet 205 may be effectively transferred from the packet buffer 234 to one or more output ports 211.

The processing circuitry 231 further comprises a network state reporter 247. The network state reporter 247 is configured to obtain one or more network state metrics associated with the network switch 113. A network state metric may comprise the instant state of the network switch 113 with respect to the packet buffer 234, one or more packet queues 241, a packet delay, a power consumption by portions of the network switch 113, or any combination thereof. The network state reporter 247 may be configured to generate a network state reporting message 251. The network state reporting message may be formatted as a packet for transmission by the network switch 113. Thus, the network switch 113 may route various data packets 205 as well as generate network state packets for reporting network state metrics.

After a data packet 205 has been processed and/or scheduled by the processing circuitry 231, the processing circuitry 231 sends the scheduled data packet 205 to one or more egress packet processors 218 for transmitting the data packet 205 via one or more output ports 211. To this end, the processing circuitry 231 is communicatively coupled to one or more ingress packet processors 214 and one or more egress packet processors 218. Although a number of ports/port sets are depicted in the example of FIG. 2, various embodiments are not so limited. Any number of ports and/or port sets may be utilized by the network switch 113.

In various embodiments, the network state reporting message 251 is configured to be transmitted via one or more output ports 211. In this respect, the network state reporting message 251 may be treated like a data packet 205 that is routed out of the network switch 113. Thus, the network state reporting message 251 may be encoded in a format used by a data packet 205.

In various embodiments, the network state reporting message 251 is configured to be transmitted via a dedicated network state reporting port 256. In this case, the dedicated network state reporting port 256 does not output data packets 205. In various embodiments, the dedicated network state reporting port 256 may be directly coupled to a network state monitor 121 (FIG. 1) to facilitate direct communication between the network switch 113 and the network state monitor 121.

Next, a general description of the operation of the various components of the network switch 113 is provided. To begin, the network switch 113 schedules/prioritizes various data packets 205 that are received by the network switch 113. As the rate at which data packets 205 arrive at the network switch 113 varies over time, the resources of the network switch 113 may be consumed. For example, the packet buffer 234 may be filled such that the available capacity of the packet buffer 234 is reduced. As another example, one or more packet queues 241 may be accumulated with an increased number of data packets 205 received at the network switch 113. Even further, the power consumption of portions of the network switch 113 may increase in proportion to the network traffic associated with the network switch 113. Also, the packet delay associated with each data packet 205 may increase as the network switch 113 handles an increased amount of network traffic.

The network state reporter 247 may generate one or more network state metrics that quantify the degree of network traffic congestion associated with the network switch 113. In various embodiments, the network state metric may be directed to a degree of use of the packet buffer 234. For example, the network state metric may relate to an amount of free space or available capacity in the packet buffer 234, a percentage or proportion of use of the packet buffer 234, the amount of data in the packet buffer 234, or any combination thereof. The network state metric may be directed to a particular partition 237 of the packet buffer 234, a particular group of partitions 237, or the total packet buffer 234.

In other embodiments, the network state metric may relate to a headroom fill level associated with the packet buffer 234 or particular partitions 237 of the packet buffer 234. A headroom fill level may be, for example, a cutoff amount associated with an amount of data that may be transmitted to the packet buffer 234 for storing. If it is the case that the headroom fill level is 90% of the packet buffer 234, then the packet buffer 234 initiates an instruction to prevent or otherwise terminate subsequent write operations to the packet buffer 234 when the packet buffer 234 is filled to 90%. Upon initiating the instruction, the packet buffer 234 may continue to receive packet data until the instruction is implemented. That is to say, the instruction to terminate subsequent write operations may take a finite amount of time before the instruction is implemented. To this end, the packet buffer 234 may be filled with an amount of data causing an excess 90% of the packet buffer 234 to be used. Thus, the headroom fill level of the packet buffer 234 provides headroom to the packet buffer 234 for absorbing additional data beyond a cutoff point.

The headroom fill level may be sets according to a worst-case scenario. The worst-case scenario, for example, may relate to an amount of data that may be written to a packet buffer 234 between the time the termination instruction is issued and the time that the termination instruction is implemented. In various embodiments, the headroom fill level may be adjusted by the processing circuitry 231.

The network state metric may also be directed to a degree of use of one or more packet queues 241, according to various embodiments. For example, a number of packets accumulated in a particular packet queue 241 or the amount of memory accumulated in the particular packet queue 241 may be used as a basis for generating a network state metric. The network state metric may relate to the use of a particular packet queue 241 or a group of packet queues 241. Accordingly, the network state metric may indicate the degree in which a group of packet queues 241 is accumulated.

In various embodiments, the network state metric is directed to a power consumption of portions of the network switch 113. For example, the network switch 113 may quantify a power consumption associated with particular portions of the network switch 113 such as, for example, the processing circuitry 231. As network traffic congestion through the network switch 113 increases, portions of the network switch 113 may realize a relatively large degree of power consumption. Accordingly, a network state metric may reflect the degree of power consumption associated with particular portions of the network switch 113.

The network state metric may also relate to a packet delay of one or more packets, according to various embodiments. A packet delay may be measured or otherwise determined by the network switch 113 for each data packet 205 that passes through the network switch 113. For example, the network switch 113 may attach an inbound time stamp to a data packet 205 upon receipt of the data packet 205. When the data packet 205 is to be transmitted via one or more output ports 211 of the network switch 113, a packet delay may be measured based on the inbound time stamp. To this end, the inbound time stamp indicates a timing that is local with respect to the network switch 113. Accordingly, the network state metric may be based at least upon an average packet delay associated with a group of data packets 205 received by the network switch 113.

The group of data packets 205 may be, for example, data packets associated with a particular application type, a particular application, a particular packet class, or any other classification of data packets 205. An application or application type may be determined based on an association of a data packet 205 to a particular application identifier. That is to say, data packets 205 may comprise an application identifier for determining an application or application type associated with the data packet 205. Thus, the network state metric may indicate a packet delay associated with data packets 205 of a particular application. The network state metric may also indicate a proportion of the packet buffer 234 and/or proportion of a partition 237 of the packet buffer 234 that is consumed by data packets 205 of particular application. Furthermore, the network state metric may indicates a number of packet queues 241 or proportion of packet queues 241 that are consumed by data packets 205 of a particular application.

In addition to obtaining a network state metric, the network switch 113 may identify a synchronous time stamp associated with the network state metric. The network state metric may reflect the network traffic congestion of the network switch 113 for a particular period of time. Based at least upon this particular period of time, a synchronous time stamp may be associated with the network state metric. The synchronous time stamp may be identified by the network switch 113 in accordance with a time synchronization protocol. Each of the network switches 113 in a computing environment 100 (FIG. 1) may be synchronized according to a reference clock 124 (FIG. 1). By using a time synchronization protocol, a network switch 113 may identify a time stamp that relates to other network switches 113 in the computing environment. That is to say, each network switch 113 in the computing environment 100 may identify respective time stamps in a synchronous manner.

The network state reporter 247 may obtain one or more network state metrics for particular period of time and identify a synchronous time stamp for the particular period of time. The network state reporter 247 may the generate a network state reporting message 251, where the network state reporting message 251 comprises one or more network state metrics and a synchronous time stamp associated with the network state metrics. Moreover, the network state reporter 247 may facilitate a transmission of the network state reporting message 251 to a predetermined network state monitor 121 (FIG. 1). The network state reporting message 251 may be transmitted via an output port 211 or a dedicated network state reporting port 256.

In various embodiments of the present disclosure, the network state reporter 247 generates a network state reporting message 251 at periodic intervals of time. For each network state reporting message 251, an updated network state metric is included. To this end, a network state monitor 121 receives network state metrics for each network switch 113 at periodic intervals of time.

In alternative embodiments, the network state reporter 247 generates the network state reporting message 251 in response to a network state metric exceeding or falling below a predetermined threshold amount. For example if the network state metric relates to an available packet buffer capacity, the network state reporter 247 may generate a network state reporting message 251 in response to the available packet buffer capacity falling below a predetermined amount of capacity. As another example, if the network state metric relates to a packet delay for a particular application, then the network state reporter 247 may generate a network state reporting message in response to the packet delay exceeding a predetermined threshold delay.

Figure 3:
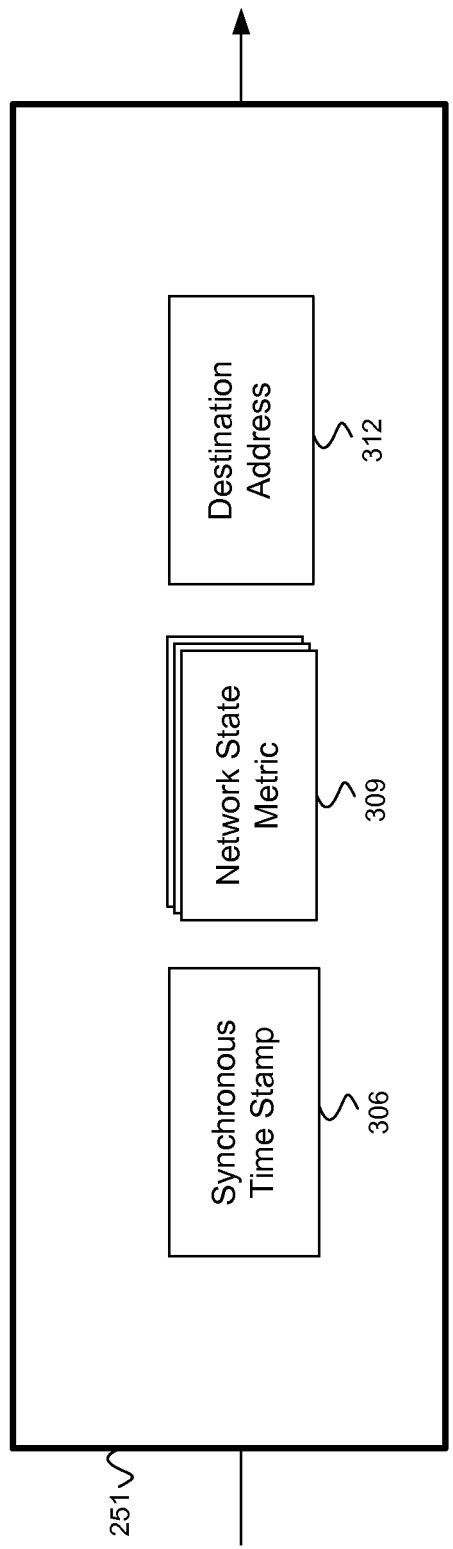
FIG. 3 is a drawing of an example of a network state reporting message generated by a network switch in the computing environment of FIG. 1, according to various embodiments of the present disclosure.

Moving to FIG. 3, shown is a drawing of example of a network state reporting message 251 generated by a network switch 113 in the computing environment 100 of FIG. 1, according to various embodiments of the present disclosure. FIG. 3 provides a non-limiting example of a network state reporting message that may be encoded as a network packet for transmission in a computing environment 100. In this respect, the network state reporting message comprises a network state packet.

The network state reporting metric comprises a synchronous time stamp 306, one or more network state metrics 309, and a destination address, according to various embodiments. The synchronous time stamp 306 is generated in accordance with a time synchronization protocol implemented by each network switch 113 in the computing environment 100. The synchronous time stamp 306 may represent a period of time associated with the network state metrics 309 included in the network state reporting message 251. For example, the network state metrics 309 may reflect a current network traffic congestion. As the network traffic congestion changes over time, updated network state metrics 309 may be obtained by the network switch 113. Accordingly, new synchronous time stamps may be identified for the updated network state metrics 309. A new synchronous time stamp and the updated network state metric 309 may be included in an updated network state reporting message.

In various embodiments, a destination address 312 is included in the network state reporting message. The destination address 312 may reference a network state monitor 121 (FIG. 1). Thus, the network state reporting metric may be transmitted to the network state monitor 121 directly or through a series of network switches 113.

Figure 4:
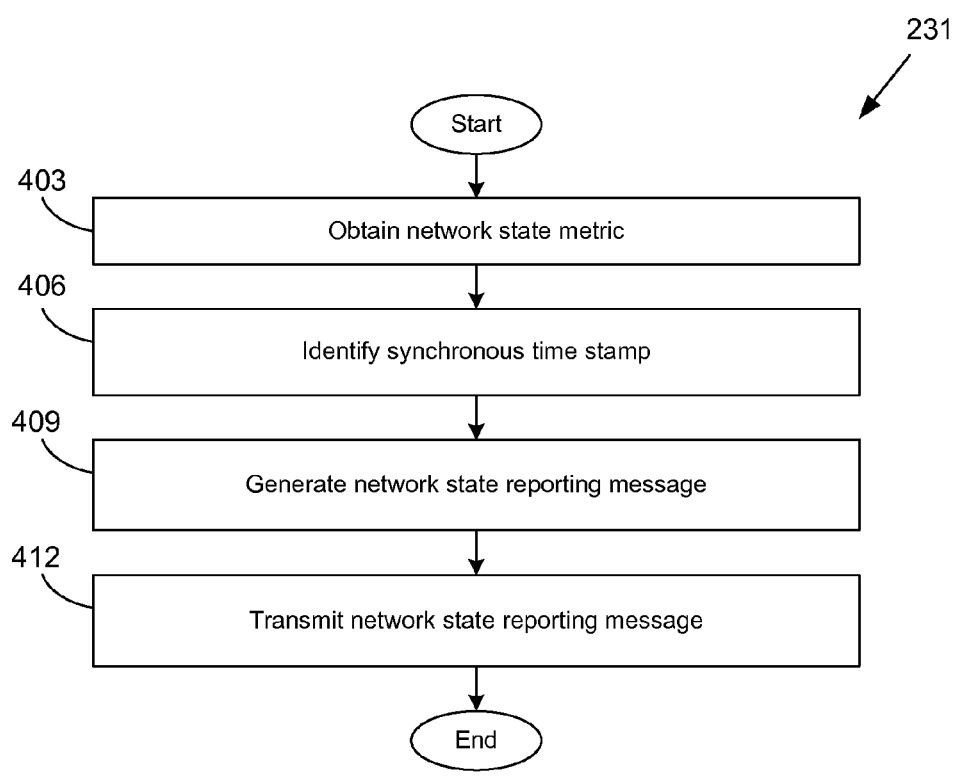
FIG. 4 is a flowchart illustrating one example of functionality implemented as portions of the processing circuitry in the network switch in the computing environment of FIG. 1, according to various embodiments of the present disclosure.

Turning now to FIG. 4, shown is a flowchart that provides one example of the operation of a portion of the logic executed by the processing circuitry 231, according to various embodiments. It is understood that the flowchart of FIG. 4 provides merely an example of the many different types of functional arrangements that may be employed to implement the operation of the portion of the logic executed by the processing circuitry 231 as described herein. As an alternative, the flowchart of FIG. 4 may be viewed as depicting an example of steps of a method implemented in the processing circuitry 231 according to one or more embodiments.

The processing circuitry 231 obtains a network state metric 309 (FIG. 3) (403). The network state metric 309 may quantify network traffic congestion associated with a particular network switch 113 (FIG. 1). The processing circuitry 231 may implement a network state reporter 247 (FIG. 2) for obtaining the network state metric 309.

The network state metric 309 may be based at least upon a data packet 205 (FIG. 2). In this case, the processing circuitry 231 determines a delay for the data packet 205 that is routed via a network switch 113 (FIG. 1). The network state metric 309 may be determined based at least upon the delay. The delay may be a packet delay that is associated with a particular group of data packets 205. The group of data packets may be associated with a packet class, an application type, an application, or any other classification of a packet. In this respect, and average packet delay may be determined for the group of data packets 205. Furthermore, the packet delay may be determined based at least upon a network switch time stamp that is local with respect to the network switch 113. When determining a packet delay for a particular application, the processing circuitry 231 may associate a set of data packets 205 to an application based at least upon a corresponding packet identifier associated with each of the data packets 205.

In various embodiments, the network state metric 309 indicates a memory capacity associated with a packet buffer 234 (FIG. 2) of the network switch 113. For example, the memory capacity may be expressed as a percentage of use, an amount of free space, a proportion of use, an amount of use, or any other indicator of expressing a remaining memory capacity. Furthermore, the network state metric 309 may be directed to a particular packet buffer partition 237 (FIG. 2) or a group of packet buffer partitions 237. That is to say, the memory capacity may be expressed on a per partition basis, a per partition group basis, or a total buffer basis. In various embodiments, the network state metric 309 comprises a headroom level associated with a packet buffer 234, a packet buffer partition 237, or a group of packet buffer partitions 237. The headroom level may indicate a limit of the quantity of packets that are to be written in the packet buffer 234.

In various embodiments the network state metric 309 is based at least upon a quantity of packets or an amount of memory accumulated in a packet queue 241 (FIG. 2) or a group of packet queues 241. The network state metric 309 may also be based at least upon the power consumption associated with a portion of the network switch 113.

The processing circuitry 231 identifies a synchronous time stamp 306 (FIG. 3) (406). For example, the network switch 113 may obtain reference clock data associated with a reference clock 124 (FIG. 1). The reference clock 124 may synchronize a set of network switches 113 such that each network switch provides time stamps that are synchronous with respect to one another. Based on the reference clock data, the processing circuitry 231 may determine a synchronous time stamp 306. The synchronous time stamp 306 is associated with the network state metric 309.

In various embodiments, each network switch 113 in a computing environment 100 implements a time synchronization protocol for generating synchronous time stamps. Thus, a particular network switch 113 may generate a synchronous time stamp 306 that represents a period of time for which the network state metric 309 is obtained.

The processing circuitry 231 generates a network state reporting message 251 (FIG. 2) (409). The network state reporting message 251 may be formatted as a packet. The network state reporting message 251 may comprise the network state metric 309 and a corresponding synchronous time stamp 306.

The processing circuitry 231 transmits the network state reporting message 251 (412). The network state reporting message 251 may be transmitted to a monitoring system such as, for example, the network state monitor 121 of FIG. 1. In this respect, the network state monitor 121 is a predetermined destination that is configured to receive network state reporting messages 251 from multiple network switches 113.

In various embodiments, a network switch 113 that implements the processing circuitry 231 comprises a dedicated output port, such that the processing circuitry 231 is configured to transmit the network state reporting message 251 via the dedicated output port. The dedicated output port may be, for example, the dedicated network state reporting port 256 of FIG. 2. In alternative embodiments, the network switch 113 comprises an output port 211 (FIG. 2) configured to route outbound data packets 205, such that the processing circuitry 231 is configured to transmit the network state reporting message via the output port 211.

In various embodiments, the processing circuitry 231 may transmit a plurality of network state reporting messages 251 at periodic time intervals such that each network state reporting message 251 represents a respective instance of network traffic congestion associated with particular network switch 113. The periodic transmission interval of the network state reporting message 251 may be adjusted by an operator/administer.

In alternative embodiments, the processing circuitry 231 is configured to transmit the network state reporting message 251 to the predetermined monitoring system in response to comparing the network state metric 309 to a predetermined threshold value. In this respect, the network state reporting message 251 is transmitted in response to a network state metric 309 exceeding or falling below a predetermined threshold value.

In various embodiments, the processing circuitry 231 may designate a predetermined packet priority to the network state reporting message 251. In this respect, the network state reporting message 251 may be received by other network components and prioritized with respect to data packets 205. That is to say, a network switch 113 may receive the network state reporting message 251 of another network switch 113 along with one or more data packets 205. This network switch 113 may prioritize the network state reporting message 251 based at least upon the predetermined packet priority.

The processing circuitry 231 and other various systems described herein may be embodied in software or code executed by general purpose hardware. As an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowchart of FIG. 4 shows the functionality and operation of an implementation of portions of the processing circuitry 231 implemented in a network switch 113 (FIG. 2). If embodied in software, each reference number, represented as a block, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the processing circuitry 231, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system comprising:
processing circuitry implemented in a switch, the processing circuitry being configured to:
determine a network state metric, the network state metric quantifying a network traffic congestion associated with the switch based on a state of data packets being processed at the switch at a specific time;
obtain reference clock data, the reference clock data being associated with a set of switches;
determine a synchronous time stamp associated with the specific time of determining the network state metric at the switch, the synchronous time stamp being determined based at least upon the reference clock data;
generate a network state packet, the network state packet comprising the synchronous time stamp and the network state metric; and
transmit the network state packet to a monitoring system.

2. The system of claim 1, wherein the switch comprises a dedicated output port, wherein the processing circuitry is configured to transmit the network state packet via the dedicated output port.

3. The system of claim 1, wherein the switch comprises an output data port configured to route outbound data packets, wherein the processing circuitry is configured to transmit the network state packet via the output data port.

4. The system of claim 1, wherein the processing circuitry is further configured to determine a packet delay for a data packet that is routed via the switch, wherein the network state metric is determined based at least upon the packet delay.

5. The system of claim 4, wherein the packet delay is determined based at least upon a switch time stamp that is local with respect to the switch.

6. The system of claim 1, wherein the processing circuitry is further configured to determine an average delay for a set of data packets routed via the switch, the set of data packets being associated with a packet class, wherein the network state metric comprises the average delay.

7. The system of claim 1, wherein the processing circuitry is further configured to:
associate a set of data packets to an application based at least upon a corresponding packet identifier associated with each of the data packets; and
determine an average application delay for the set of data packets routed via the switch, wherein the network state metric comprises the average application delay.

8. A network switch comprising:
a plurality of input ports configured to receive data packets;
a plurality of output ports configured to transmit the data packets; and
processing circuitry configured to:
determine a network state metric, the network state metric being associated with a routing of the data packets from the plurality of input ports to the plurality of output ports, the network state metric indicating a state of the data packets being processed at the switch at a specific time;
determine a synchronous time stamp associated with the specific time of determining the network state metric at the switch, the synchronous time stamp being based on a reference clock, the reference clock being associated with a plurality of switches;
generate a network state packet, the network state packet comprising the synchronous time stamp and the network state metric; and
transmit the network state packet to a predetermined monitoring system.

9. The network switch of claim 8, wherein the network switch further comprises a packet buffer configured to store at least a portion of the data packets, wherein the network state metric indicates a memory capacity of the packet buffer.

10. The network switch of claim 9, wherein the packet buffer is partitioned into a set of packet buffer partitions, wherein the network state metric is based at least upon a memory capacity of a packet buffer partition.

11. The network switch of claim 8, wherein the network switch further comprises a packet buffer configured to store at least a portion of the data packets, the packet buffer being associated with a headroom level, the headroom level being configured to limit quantity of packets written to the packet buffer, wherein the network state metric comprises the headroom level.

12. The network switch of claim 8, wherein the network switch further comprises a packet queue, the packet queue being configured to store packet buffer addresses associated with at least a portion of the data packets, wherein the network state metric is based at least in part upon a quantity of packets accumulated in the packet queue or an amount of memory accumulated in the packet queue.

13. The network switch of claim 8, wherein the network state metric is based at least in part upon a power consumption of at least a portion of the network switch.

14. The network switch of claim 8, wherein the processing circuitry is further configured to transmit the network state packet to the monitoring system in response to comparing the network state metric to a predetermined threshold value.

15. A method comprising:
obtaining a network state metric, the network state metric quantifying a network traffic congestion associated with a switch based on a state of data packets being processed at the switch at a specific time;
identifying a synchronous time stamp associated with the specific time of determining the network state metric at the switch;
generating an network state reporting message, the network state reporting message comprising the network state metric and the synchronous time stamp; and
transmitting the network state reporting message to a monitoring system.

16. The method of claim 15, wherein the switch is one of a plurality of switches, the plurality of switches being synchronized according to a reference clock, wherein the synchronous time stamp is based at least upon the reference clock.

17. The method of claim 15, wherein the switch is configured to relay data packets, wherein the network state reporting message is encoded as a network state packet.

18. The method of claim 17, further comprising designating a predetermined packet priority to the network state packet for facilitating transmission to the monitoring system.

19. The method of claim 15, further comprising:
obtaining an updated network state metric; and
transmitting an updated network state reporting message according to a predetermined transmission interval, the updated network state reporting message comprising the updated network state metric.

20. The method of claim 15, wherein transmitting comprises transmitting in response to comparing the network state metric to a predetermined threshold value.

* * * * *